Patented Jan. 11, 1949

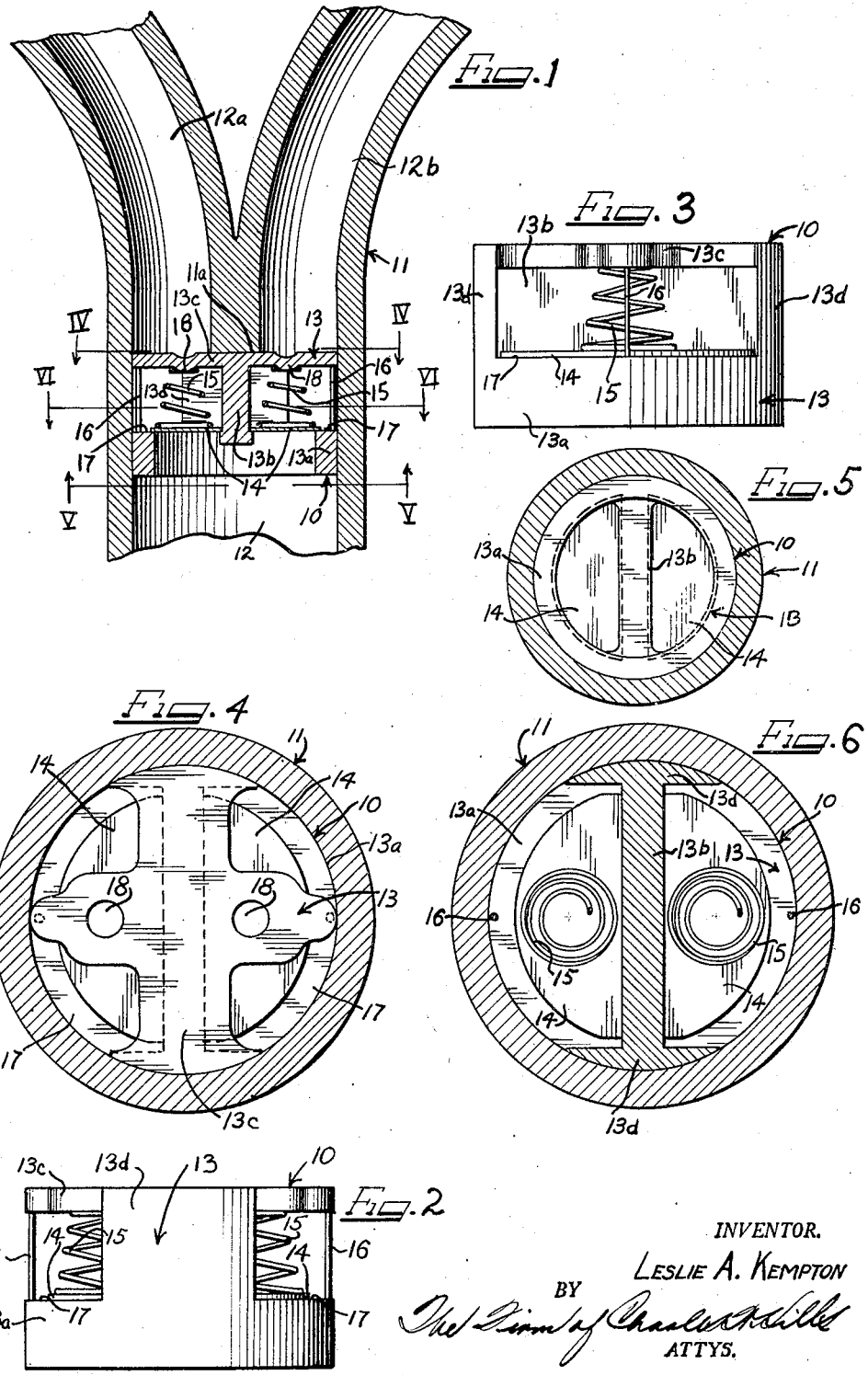

2,458,710

UNITED STATES PATENT OFFICE 2,458,710

MULTIPLE CHECK VALVE

Leslie A. Kempton, St. Petersburg, Fla., assignor to The Dole Valve Company, Chicago, Ill., a corporation of Illinois Application December 6, 1946, Serial No. 714,515

5 Claims. (Cl. 277—60)

1

This invention relates to multiple check devices. Specifically the invention deals with a multiple check valve unit adapted to be inserted in a main pipe at its junction with branch pipes for preventing back flow from the branch pipes into the main pipe, and for preventing cross flow between the branch pipes while accommodating flow from the main pipe into the branch pipes.

The invention will hereinafter be specifically described as embodied in a double check valve unit having two longitudinal passages therethrough and a separate spring-pressed valve controlling flow through each passage. It should be understood, however, that the invention is not limited to a double unit, since more than two passages and valves can be provided in the unit without departing from the principles of this invention.

According to this invention a housing, preferably in the form of a hollow cylinder, is provided with an interior partition wall dividing it into several compartments. A valve seat is provided in each compartment and cut-out portions provide ports on the discharge sides of the valve seats so that flow restrictions will be minimized. An end wall overlies the partition wall and valve seats but this end wall is cut away to conform with the ports so that axial flow will not be impeded. Each valve seat has a separate valve member coacting therewith. A spring is compressed between each valve member and the overhanging end wall for urging the valve member against its seat. Guides for the valve member are provided by those portions of the side wall of the housing which have not been cut away, and preferably also by pin members extending between the end wall and the valve seats. These guides are arranged so that the valve will not cock or tilt as they function.

A feature of the invention deals with the provision of a self-contained unit that is readily inserted in a pipe to be bottomed at the junction of the pipe with its branches, which unit has greatly enlarged port areas that will minimize obstructions to flow from the pipe to its branches without, however, making possible a cross flow between the branches. The units of this invention are especially useful in mixing valves for automatic washing machines and the like, but, of course, are not limited to such usage.

It is, then, an object of this invention to provide a self-contained multiple check valve unit having flow ports of maximum capacity to minimize flow restrictions in a conduit containing the unit.

2

A further object of this invention is to provide a self-contained multi-check valve unit with independent passages controlled by separate spring-pressed valves and having port openings of maximum flow capacity.

Another object of this invention is to provide a double check valve unit for insertion in a conduit and composed of a cylindrical housing bisected by a partition wall and having cut out portions on opposite sides of the partition wall providing ports, together with valve seats at the bases of the cut out portions and spring-pressed valves coacting with said seats.

A specific object of this invention is to provide a double check valve unit with a housing having a ring portion with an upstanding partition wall carrying an end wall in overhanging spaced relation above the ring portion, together with separate valves pressed on an end face of the ring by means of compressed springs bottomed on the overhanging portion.

A still further object of the invention is to provide a multiple check valve wherein a housing slidably guides the individual valves without obstructing flow passage.

Other and further objects of the invention will be apparent to those skilled in the art from the following detailed description of the annexed sheet of drawings which, by way of a preferred example only, illustrates one embodiment of the invention.

On the drawings:

Figure 1 is an axial cross-sectional view of a branched flow conduit containing a double check valve unit according to this invention.

Figure 2 is a side elevational view of the check valve unit contained in Figure 1.

Figure 3 is a view similar to Figure 2 but illustrating the unit rotated 90° from the position shown in Figure 2.

Figure 4 is a transverse cross-sectional view taken along the line IV—IV of Figure 1 and illustrating the check valve unit in top plan.

Figure 5 is a transverse cross-sectional view taken along the line V—V of Figure 1 and illustrating the check valve unit in bottom plan.

Figure 6 is a transverse cross-sectional view taken along the line VI—VI of Figure 1 and illustrating the check valve unit in transverse cross section.

As shown on the drawings:

The double check valve unit 10 of this invention is shown in Figure 1 as being mounted in a branched conduit or pipe 11 having a main supply passageway 12 and branch passageways 12a and 12b extending axially therefrom. The unit 10 of this invention is mounted in the main passageway 12 and is bottomed at the junction of this passageway with the branch passageways 12a and 12b. A shoulder 11a is provided at the central portion of the junction between the main and branch passageways.

The unit 10 of this invention is composed of a cylindrical housing 13, a pair of flat lightweight valves 14, 14, coil springs 15, 15 acting on the 14, 14 and guide pins 16, 16 anchored in the housing 13.

The housing 13 is in one piece and has base ring portion 13a with a partition wall 13b extending diametrically across one end thereof and continuing upwardly to an end wall 13c in the shape of a cruciform and having the legs thereof extending into overhanging relationship with the ring. Fragmental cylindrical side walls 13d, 13d extend upwardly from the ring portion 13a and laterally outwardly at the ends of the partition wall 13b.

Valve seats 17, 17 are provided on opposite sides of the partition wall 13b by the end face of the ring portion 13a and by shoulders on opposite faces of the partition wall. These valve seats 17, 17, therefore, have D shapes with the straight leg portions thereof on each side of the partition wall 13b and with the semi-circular portions thereof extending around the end face of the ring 13a.

The valves 14, 14 are in the shape of fragmental circular disks and seat on the seats 17, 17 in spaced relationship from the partition wall 13b, the upstanding side walls 13d, and the guide pins 16 but the valves, when misaligned, are adapted to be guided by these pins and walls to prevent cocking or tilting.

The cruciform-shaped end wall 13c has two of the legs thereof extending radially of the valve members 14, 14 in overhanging relationship therewith, and these legs bottom the coil springs 15, 15. Embossments 18 in these legs center the end coils of these springs 15 to hold them against lateral movement relative to the housing. The springs are preferably tapered, with the small end coils surrounding the embossments 18 and with the large end coils seated on the disk-like valves 14.

The guide pins 16 extend from the ring-like base 13a to the embossed legs of the cruciform-shaped end wall. The pins are anchored in these legs as well as in the ring portion.

The housing 13 has unobstructed ports on the discharge sides of the valve seats 17 since the side walls 13d, 13d extend only for a short distance on opposite sides of the partition wall 13b as shown in Figure 6. The spaces between the legs of the cruciform end walls 13c are relatively large and provide axial end openings for the ports.

The unembossed legs of the end walls 13c are integrally joined with the tops of the side walls 13d and slightly overhang the valve members 14 on opposite sides of the partition walls 13b so that these valve members cannot cock out of position even when fully opened.

The housing 13 is sized for a snug or press fit in the main passageway 12 of the conduit 11 in abutting relation with the shoulder at the junction between the branches 12a and 12b. The partition wall 13b of the housing is aligned with the wall between the branches so that a port on each side of the wall communicates only with one passage 12a or 12b. In this position, the wall 13b, in effect, extends the separating wall between the branch conduits to the valve seats. While the embossed legs of the end wall 13c of the housing 13 will then extend across the mouths of the passages 12a and 12b, they do not materially impede flow from the ports because the legs are relatively narrow.

When the valves 14 are on their seats 17, no flow between passages 12, 12a, and 12b can occur. When the valves are unseated, fluid from 12 can flow into 12a and 12b, but no fluid flow between 12a and 12b can occur.

The units of this invention are insertable in standard branch conduits and have sufficiently large ports so that flow capacity of the conduits is not seriously decreased.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A multi-check unit adapted to be inserted in a main pipe at its junction with branch pipes for preventing back flow from the branch pipes into the main pipe and cross flow between the branch pipes while accommodating substantially unimpeded flow from the main pipe into the branch pipes comprising a housing sized for snugly fitting in the main pipe and having a bisecting internal partition wall with ported side walls at the ends of the partition wall and extending laterally therefrom, seats on said housing on opposite sides of the partition wall, an end wall on the partition wall in spaced relation from said seats and overhanging the seats, said end wall having openings therein aligned with the ports for accommodating flow from the ports, valve members coacting with said seats, and springs compressed between the end wall and valve members to hold the valve members on the seats.

2. A multi-check unit adapted to be inserted in a main pipe at its junction with branch pipes which comprises a cylinder bisected with an internal partition wall and having cut out side walls spaced from one end thereof on opposite sides of the partition wall, seats on opposite sides of the partition wall at the bases of the cut out walls, a cruciform-shaped end wall on said cylinder having the legs thereof overlying said seats and having spaces between said legs coacting with the cut out side walls to provide ports accommodating flow through the cylinder, valve members coacting with said seats, and springs compressed between said valve member and said legs of the end wall urging the valve members against said seats.

3. A double check valve comprising a hollow cylinder bisected by a partition wall, a cruciform-shaped end wall at one end of said cylinder, ports in said end wall and side walls of the cylinder on opposite sides of the partition wall, D-shaped valve seats on said cylinder on opposite sides of the partition wall at the bases of said ports, fragmental circular flat valve disks coacting with said seats, coil springs compressed between the end wall and the disks urging the disks against the seats, and guide means adjacent the disks extending between the end wall and seats for directing the disks on and off of the seats.

4. A double check valve comprising a hollow cylinder, a partition wall bisecting said cylinder, an end wall on said cylinder, ports cut through the sides and end wall of the cylinder on opposite sides of the partition wall to provide axial flow openings through the cylinder on opposite sides of the partition wall, D-shaped valve seats on said cylinder spaced from said end wall, said end wall having relatively narrow legs extending radially in overhanging relation to said seats, guide pins connecting the outer ends of said legs with said seats, said legs having lugs depending therefrom between the guide pins and the partition wall, fragmental circular flat disks coacting with said seats, and coil springs compressed between said legs and disks and having end coils surrounding said lugs.

5. A double check valve accommodating axial flow from a main conduit into branch conduits while preventing cross flow between the branch conduits which comprises a hollow housing adapted to be snugly seated in the main conduit and having an end wall adapted to abut the dividing wall between the branch conduits extending from the main conduit, said housing having a partition wall therein extending the dividing wall into the main conduit when the end wall is abutted against the dividing wall, ports in the sides and end of the hollow housing accommodating axial flow through the housing on opposite sides of the partition wall, said housing having seats spaced from the end wall thereof on opposite sides of the partition wall, and spring pressed valves coacting with said seats.

LESLIE A. KEMPTON.

REFERENCES CITED

The following references are of record in the file of this patent:

UNITED STATES PATENTS

| Number | Name | Date |
|---|---|---|
| 2,039,343 | Prokul | May 5, 1936 |